(12) United States Patent
Nelson et al.

(10) Patent No.: US 6,467,215 B1
(45) Date of Patent: Oct. 22, 2002

(54) BLOOD-SUCKING INSECT BARRIER SYSTEM AND METHOD

(75) Inventors: J. Roy Nelson, Pennington, NJ (US); Wayne N. Andrews, Dighton, MA (US); Lantz S. Crawley, Pennington, NJ (US)

(73) Assignee: Bugjammer, Inc., Pennington, NJ (US)

( * ) Notice: Subject to any disclaimer, the term of this patent is extended or adjusted under 35 U.S.C. 154(b) by 0 days.

(21) Appl. No.: 09/573,382

(22) Filed: May 19, 2000

(51) Int. Cl.[7] ............................. A01M 1/02; A01M 1/06
(52) U.S. Cl. ......................... 43/107; 43/132.1; 43/139
(58) Field of Search .............................. 43/107, 132.1, 43/124, 139; 381/61, 124; 84/332, 331, 334, 337, 340, 341, 402, 405, 407; 181/155, 156, 160

(56) References Cited

U.S. PATENT DOCUMENTS

| | | | | |
|---|---|---|---|---|
| 923,368 A | * | 6/1909 | Myser | 43/139 |
| 2,694,879 A | * | 11/1954 | Stoll | 43/139 |
| 2,879,620 A | * | 3/1959 | McGinnis | 43/139 |
| 2,917,736 A | | 12/1959 | Marotta | 340/385.1 |
| 2,922,999 A | | 1/1960 | Carlin | 367/139 |
| 3,156,212 A | * | 11/1964 | Buell, Jr. | 43/124 |
| 3,517,390 A | * | 6/1970 | Whitehead | 181/160 |
| 3,529,691 A | | 9/1970 | Wesemann | 181/31 |
| 3,683,113 A | | 8/1972 | Stewart | 340/384.2 |
| 3,826,333 A | | 7/1974 | Buckwalter | 181/31 B |
| 3,872,472 A | * | 3/1975 | Moschgat | 43/124 |
| 3,884,326 A | | 5/1975 | Orisek | 181/155 |
| 3,891,970 A | | 6/1975 | Brotz | 340/162 |
| 3,893,106 A | | 7/1975 | Schulein | 340/384.2 |
| 3,931,865 A | | 1/1976 | Levitt | 367/139 |
| 3,950,886 A | | 4/1976 | Newhall et al. | 43/112 |
| 3,964,025 A | | 6/1976 | Oosterhouse | 340/162 |
| 3,980,154 A | * | 9/1976 | Johnson | 181/155 |
| 4,168,591 A | | 9/1979 | Shaw | 43/114 |
| 4,187,635 A | * | 2/1980 | Deissler | 84/402 |
| 4,338,593 A | | 7/1982 | Mills | 340/384.2 |
| 4,464,784 A | | 8/1984 | Agnello | 381/61 |
| 4,506,473 A | | 3/1985 | Walters, Jr. | 43/107 |
| 4,566,085 A | | 1/1986 | Weinberg | 367/139 |
| 4,725,993 A | | 2/1988 | Owen et al. | 367/139 |
| 4,920,569 A | | 4/1990 | Yoshio | 381/61 |
| 4,998,091 A | | 3/1991 | Rezmer | 340/384.2 |
| 5,025,886 A | * | 6/1991 | Jung | 181/156 |
| 5,040,326 A | * | 8/1991 | Van Dijinsen et al. | 43/139 |
| 5,061,918 A | | 10/1991 | Hunter | 340/573.2 |

(List continued on next page.)

FOREIGN PATENT DOCUMENTS

| | | | | |
|---|---|---|---|---|
| CH | 601 978 | 7/1978 | | A01M/29/00 |
| DE | 959 861 | 3/1957 | | |
| DE | 28 11 532 | 6/1977 | | H05C/1/02 |
| DE | 26 22 101 | 12/1977 | | A01M/5/00 |

Primary Examiner—Darren W. Ark
(74) Attorney, Agent, or Firm—Darby & Darby (57) ABSTRACT

A method for attracting insects to control stations in a centralized system includes the steps of generating at the central node an acoustic wave, propagating the acoustic wave through the hollow tubing, and emitting the acoustic wave at the control station to attract insects into an attractant zone proximate to the control station. A method for establishing a barrier to blood-sucking insects and to animal pests is also disclosed. A barrier is defined by arranging plural control stations relative to a central distribution point. According to this method, a central distribution point is provided with a sound source which generates a sound wave suitable for attracting blood-sucking insects. A branching network of hollow tubing is established in which the hollow tubing is communicatively connected to the central distribution point for receiving the generated sound wave. A plurality of control stations is connected to the branching network of hollow tubing so that there is no more than a prescribed spacing between adjacent ones of the plural control stations. At least the sound wave is conveyed from the central distribution point to the plural control stations for emanation thereat to define the barrier.

19 Claims, 5 Drawing Sheets

U.S. PATENT DOCUMENTS

| | | | | |
|---|---|---|---|---|
| 5,111,509 A | * | 5/1992 | Takeuchi et al. | 181/160 |
| 5,164,915 A | | 11/1992 | Blyth | 365/45 |
| 5,206,465 A | * | 4/1993 | Jung | 181/156 |
| 5,210,719 A | | 5/1993 | Lawrence | 367/139 |
| 5,231,790 A | | 8/1993 | Dryden et al. | 43/113 |
| 5,241,778 A | | 9/1993 | Price | 43/132.1 |
| 5,255,468 A | | 10/1993 | Chesire, Jr. | 43/113 |
| 5,269,091 A | | 12/1993 | Johnson et al. | 43/98 |
| 5,296,656 A | * | 3/1994 | Jung | 181/156 |
| 5,311,697 A | * | 5/1994 | Cavanaugh et al. | 43/132.1 |
| 5,339,007 A | | 8/1994 | Walton | 315/205 |
| 5,386,472 A | | 1/1995 | Pfaff et al. | 381/71 |
| 5,455,779 A | | 10/1995 | Sato et al. | 364/574 |
| 5,468,938 A | | 11/1995 | Roy | 219/690 |
| 5,644,109 A | * | 7/1997 | Newman | 181/156 |
| 5,657,576 A | | 8/1997 | Nicosia | 43/132.1 |
| 5,734,728 A | | 3/1998 | Meissner | 381/89 |
| 5,892,182 A | | 4/1999 | Newman | 181/156 |
| 5,926,997 A | * | 7/1999 | Wilcox | 43/132.1 |
| 5,943,815 A | | 8/1999 | Paganessi et al. | 43/107 |
| 5,986,194 A | * | 11/1999 | Schwartz et al. | 84/402 |
| 6,031,916 A | | 2/2000 | Saito et al. | 381/61 |
| 6,032,406 A | | 3/2000 | Howse et al. | 43/114 |
| 6,044,047 A | | 3/2000 | Kulas | 369/32 |
| 6,055,766 A | | 5/2000 | Nolen et al. | 43/112 |
| 6,067,279 A | | 5/2000 | Fleming, III | 369/32 |
| 6,088,949 A | | 7/2000 | Nicosia et al. | 43/107 |
| 6,122,230 A | | 9/2000 | Scibora | 369/32 |
| 6,141,428 A | * | 10/2000 | Narus | 181/156 |
| 6,212,138 B1 | | 4/2001 | Kalis et al. | 369/34 |

* cited by examiner

BLOOD-SUCKING INSECT BARRIER SYSTEM AND METHOD

DESCRIPTION OF RELATED PRIOR ART

This application is related in subject matter to U.S. Pat. No. 5,241,778, issued Sep. 7, 1993, "Method of Attracting and Eradicating Insects Comprising Attracting Insects to a Heartbeat Sound."

FIELD OF THE INVENTION

This invention relates primarily to a system and method for selectively repelling insects from or attracting insects to an insect station.

BACKGROUND OF THE INVENTION

A discussion of historical approaches to addressing insect problems is detailed in U.S. Pat. No. 5,241,778 which is assigned to the present assignee and which is hereby incorporated by reference as if set forth in its entirety herein. The aforesaid '778 patent describes a method for attracting and eradicating insects using a heartbeat sound to attract the insects. According to the '778 patent, multiple speakers can be spaced apart to establish discrete zones to attract mosquitos and other insects. U.S. Pat. No. 4,168,591 discloses a method which utilizes a combination of heat and moisture to attract insects. U.S. Pat. No. 4,506,473 discloses a method for attracting blood-sucking insects using carbon dioxide.

To date, prior art techniques have not met with any substantial commercial success. Moreover, most of the effort to control insect populations has been embodied in discrete stations positioned to maximize their effect while minimally disturbing the people nearby.

What is needed in the art and heretofore has not been available is an improved system and method for controlling insect populations. What is further needed is such a system and method which is suitable for wide-area insect control in private outdoor spaces, public parks, golf courses, and hotel grounds. The present invention satisfies these and other needs.

SUMMARY OF THE INVENTION

The present invention provides a centralized system and method for controlling insect populations such as biting arthropods. The invention utilizes sound waves as either an attractant or repellant in order to control pest populations in a target region. The sound waves to be employed can be selectively established to achieve the desired function. Thus, a simulated heartbeat sound or other low frequency sound (e.g. in the range of 50 to 350 cycles per second ("cps"), depending on the sound intensity and periodicity) can be employed as an attractant or as a repellant of insects such as mosquitos. The invention achieves population control of insects through the use of inexpensive control stations which are connected, directly or indirectly through other control stations, to a central distribution point. The low value of the field units (control stations) greatly reduces the risk of thievery and the potential impact of vandalism.

The invention can make use of other factors, which may or may not be critical, depending on whether insect attraction or repulsion is desired. Those factors include carbon dioxide, octanol, lactic acid, negative pressure (a partial vacuum), and heat, to name a few.

In a preferred embodiment, the system and method are employed to attract insects. Through the continued use of the inventive system, an insect population in a given area can drop to a level below which the insect no longer functions as a disease vector.

In one aspect, the invention provides a method for attracting insects to at least one control station which is remotely positioned relative to a central node in a system of control stations. The method according to this first aspect of the invention includes the steps of generating at the central node an acoustic wave, propagating the acoustic wave through the hollow tubing, and emitting the acoustic wave at the control station to attract insects into an attractant zone proximate to the control station.

In another aspect, the invention provides a method for establishing a barrier to blood-sucking insects. The method according to this aspect of the invention defines a barrier by arranging plural control stations relative to a central distribution point. According to this method, a central distribution point is provided with a sound source which generates a sound wave suitable for attracting blood-sucking insects. A branching network of hollow tubing is established in which the hollow tubing is communicatively connected to the central distribution point for receiving the generated sound wave. A plurality of control stations is connected to the branching network of hollow tubing so that there is no more than a prescribed spacing between adjacent ones of the plural control stations. At least the sound wave is conveyed from the central distribution point to the plural control stations for emanation thereat to define the barrier.

In a further aspect, the invention provides a method for establishing a barrier to animal pests such as deer and rabbits, to name a few. This method is similar to the method described above, however, the sound source in this method generates a sound wave suitable for repelling animal pests. Otherwise, the method steps are as described above and result in sound waves emanating at the control stations to define a barrier to repel animal pests and undesired creatures.

Methods in accordance with the foregoing aspects of the invention can include one or more of the additional steps indicated below:

a. drawing insects into the hollow tubing once attracted into the attractant zone through the use of a source of negative pressure;

b. constructing the acoustic wave so that it is simulative of at least a portion of a heartbeat;

c. releasing one or more of the byproducts of respiration proximate to the control station;

d. releasing an insect pesticide proximate to the control station; and e. providing a pathogen to biting arthropods or other insects proximate to or upon the control station.

The method also can include steps and features described below in connection with the Drawing Figures and the Detailed Description of Certain Preferred Embodiments.

The significant advantage of the present invention is that a highly cost-effective and environmentally safe technique is provided to control the insect population, and particularly the population of mosquitos. The technique of the present invention can be employed on a large scale by municipalities to control mosquitos throughout an entire city, or can be employed by an individual to control the mosquito population in a backyard. The device of the present invention can kill attracted mosquito by various techniques and equipment.

These further objects, features, and advantages of the present invention will become apparent from the following detailed description, wherein reference is made to the figures in the accompanying drawings.

DETAILED DESCRIPTION OF CERTAIN PREFERRED EMBODIMENTS

Figure 1:
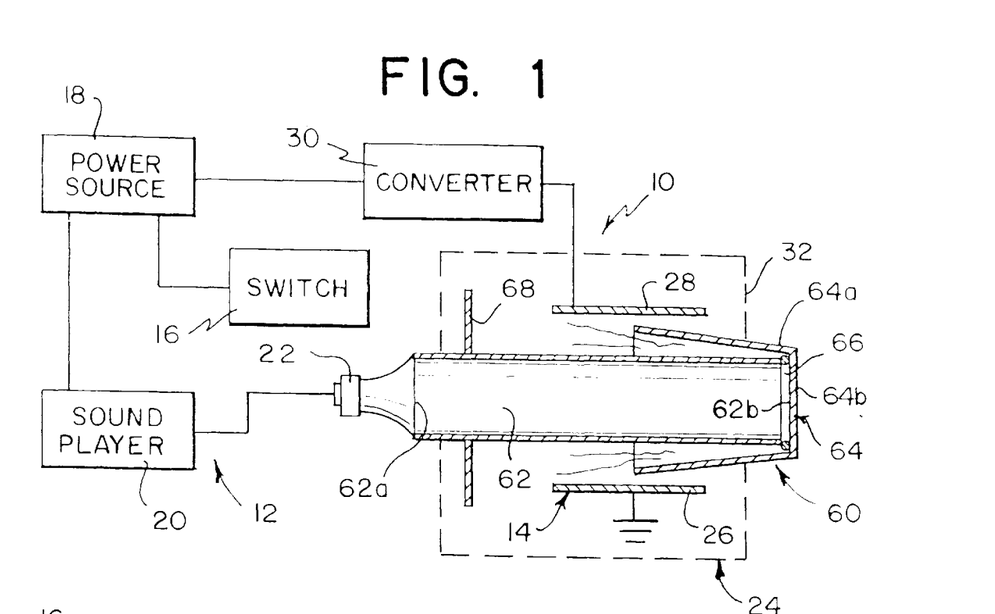
FIG. 1 is a schematic view of an insect attractant and eradication device according to the present invention.

By way of overview and introduction, FIG. 1 depicts an assembly or control station 10 comprising an insect attractant device 12 and an insect eradication device 14 in accordance with a preferred embodiment of the present invention. The invention can be implemented, however, without an eradication device, as previously stated, because insects can be attracted to an area and thereby keep insects away from another area to be utilized by humans. Whether a device manufactured in accordance with the present invention includes an eradication device 14 or not, the assembly 10 is more generally referred to herein as a control station. The control station of the present invention has utility for various species of bloodsucking insects, particularly insects such as mosquitos and blackflies. The invention is specifically described below with regard to an application for attracting and eradicating mosquitos of the variety that conventionally feed on humans, although modifications to the device will be clear to one of skill in the art to attract and eradicate mosquitos that feed on any particular animal species, or other bloodsucking insects or other pests, as described further below.

Referring to FIG. 1, one embodiment of the control station 10 includes an attractant device 12 which comprises an on/off switch 16, an electrical power source 18, a sound player 20, and an acoustic speaker 22. The attractant device 12 utilizes very little energy, and thus can be activated continually. The attractant device 12 also can be selectively rendered operable by switch 16 and can be activated, for example, an hour before and during the time interval when children are scheduled to play in a backyard adjacent to the device. Alternatively, a conventional timing circuit (not shown) can be employed to automatically activate the control station, for example, between the hours of 5:00 a.m. and 7:00 a.m. and between 5:00 p.m. and 10:30 p.m., when mosquitos are typically active and are generally bothersome to people.

The power source 18 is conventional and forms no part of the present invention.

Suffice to say, the power source can be a conventional household power source, a generator that outputs electrical power, or a battery source.

Sound player 20 also can be conventional in design, needing only to be capable of repeatedly playing acoustic signals. The sound player 20 is fitted with either analog or digital information which, when played through the sound player, outputs an analog signal. The analog signal from the sound player 20 is provided to the speaker 22 which transduces the signal into a sound that simulates a heartbeat, as more specifically described below, to attract insects such as mosquitos or to repel them. Only a limited frequency range need be produced by the speaker 22 to simulate the heartbeat. The volume or decibel output of the control station is established so that the target insect or pest can detect the sound and perceive it as a heartbeat so as to be attracted to or repelled from the area of the speaker, as desired. Preferably, the acoustic output of the control station is set at a level which is not readily audible to humans. The effective area (or volume) to which mosquitos are attracted or repelled is at least partially a function of the decibel level output of the speaker. Once attracted, the insects will generally occupy the area (or, stated more accurately, the volume or zone) conceptually shown in FIG. 1 to be bounded by dashed lines 24 in the immediate vicinity of the control station. It has yet to be determined the statistical time period that a mosquito attracted to the control station will remain within zone 24 before losing interest.

The eradication device 14 of the control station of FIG. 1 is of the electrocution type. This type of electrocution equipment is conventionally and successfully used, for example, by illumination-type attractant devices. Accordingly, the eradication device 14 is depicted conceptually in FIG. 1, and comprises a ground end plate 26 and a charged plate 28, each spaced adjacent to the edges of attractant zone 24. Plate 28 is supplied with DC power from converter 30, which in turn is connected to power source 18. The charge on plate 28 is normally insufficient to spark across ground plate 26, so that little power is normally consumed to maintain the eradication device activated. When a mosquito enters the zone 24, however, its presence is sufficient to cause electrical plate 28 to spark across to plate 26. During this intermittent sparking action, a mosquito is electrocuted. Conventional protective shielding, such as a wire mesh, can be used to ensure that twigs, birds, and children's fingers do not inadvertently enter the zone 24. Again, more sophisticated electrocution devices can be used to kill the mosquitos. The advantage of the control station of the present invention resides in its ability to attract targeted insects into the zone 24 or repel them away from the zone, and does not reside in the type of eradication device that may or may not be employed.

In lieu of an eradication device 14, a trap can be provided within the attractant zone 24. The trap preferably comprises a gluey or sticky surface, but can comprise other traps including nettings, depending on the type of insect that is to be trapped. Insect traps using gluey surfaces are particularly useful when the control station is utilized to monitor an insect population in a desired area. Again, the advantage of the control station resides in its ability to attract targeted creatures into the zone 24 or repel them away from the zone, and not with respect to the type of trap that may or may not be provided.

Figure 2:
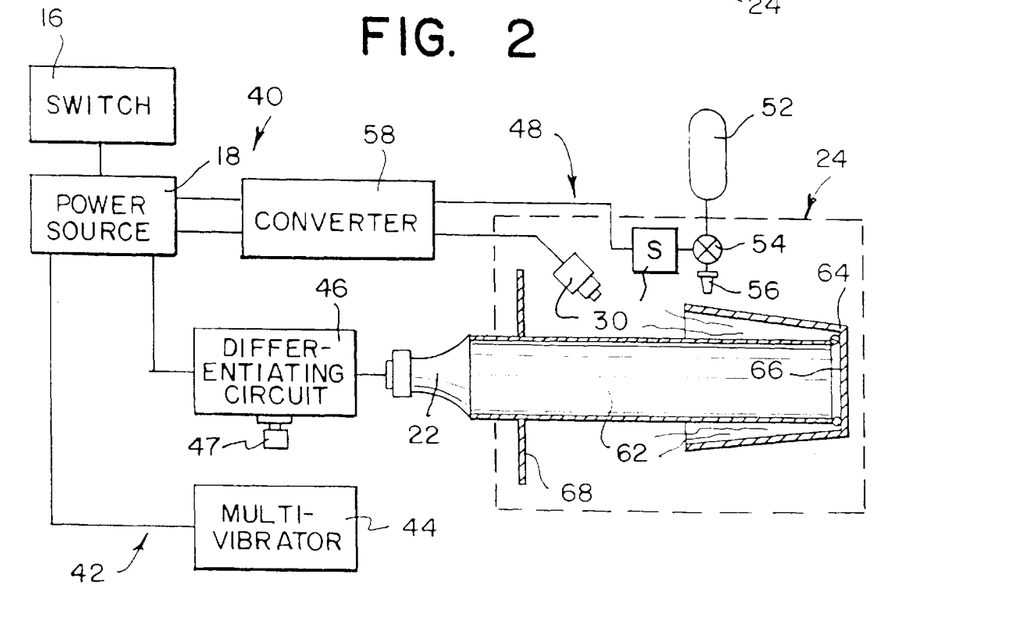
FIG. 2 is an alternative embodiment of an insect attractant and eradication device.

FIG. 2 depicts another embodiment of a control station 40 according to the present invention. The control station 40 includes attractant device 42 comprising a switch 16, power source 18, and speaker 22 as previously described, and further includes an astatic multivibrator 44 and a differentiating circuit 46. The multivibrator 44 is powered by source 18, and provides a square wave voltage output having a constant period and cycle ratio. Differentiating circuit 46, which is also powered by source 18, generates a time derivative of a square wave voltage output such that the output of circuit 46 comprises pulses associated with the signal supplied by the multivibrator. The diaphragm of speaker 22 is driven by the pulses from circuit 46 to provide an acoustic wave representative of the human heartbeat. An adjustment knob 47 is provided for selectively varying and "fine tuning" the frequency signals delivered to the acoustic speaker. A heartbeat emulator comprises the combination of the multivibrator 44, the differentiating circuit 46, the adjustment knob 47 and perhaps further circuitry which together emulate a complex heartbeat signal.

Also illustrated in FIG. 2 is an alternative eradication unit 48 adapted to eradicate insects such as mosquitos. The eradication unit 48 comprises a sensor 50, an insect toxic gas container 52, a solenoid valve 54, a spray nozzle 56, and a converter 58. Electrically powered sensor 50 periodically scans the zone 24 and generates a signal when one or more mosquitos are present within the zone 24. A triggering signal is generated within converter 58 as a result of an insect being present in the zone 24, or alternatively when a preselected number of mosquitos, e.g., six or more, occupy the zone 24. This triggering signal results in the opening of solenoid valve 54, which can be automatically returned to its normally closed position by a spring or other biasing device after a predetermined period of time, for example, two seconds. While valve 54 is briefly open, insect toxic fluid from container 52 is expelled through spray nozzle 56 into the zone 24, thereby killing or eradicating insects within or adjacent to zone 24. The fluid within the container 52 can be of various formulations known to kill or immobilize insects, and particularly mosquitos, or can be of a formulation that confuses insects or prevents them from thereafter being attracted to humans. This insect toxic formulation need not be hazardous to humans, and can be expelled at a dosage that is lethal to mosquitos within zone 24, but that is neither detected by nor harmful to human or pets within the general vicinity of the control station 40.

It should be understood that the attractant devices 12, 42 and the eradication devices 14, 48 of the embodiments of FIGS. 1 and 2 can be interchanged to form additional embodiments. Also, the control station can include a one-way trap constructed of fine mesh screen that kills, immobilizes, or traps insects, or an arrangement can be employed which drowns insects attracted into the zone 24. As previously noted, the attractant device of this invention has utility apart from being used in conjunction with an eradication device.

In accordance with a salient aspect of the present invention, the output of the speaker 22 is conveyed into the zone 24 through a sound distribution system 60. The distribution system 60 comprises a sound tube 62, a resonator 64, and an annular gasket 66. The sound tube 62 provides a sealed chamber for conveying at least a forward wave emanating from the speaker 22 from tube end 62a to tube end 62b. The sound tube can be formed from a number of different materials which are capable of transmitting sound waves at the frequency of interest with minimal absorption or loss. PVC tubing in the range of 0.75" to 4.00" in diameter has been found to be suitable, and 2.00" diameter is presently preferred. The end 62a of the sound tube is coupled to the emitter of the speaker 22 while the end 62b is preferably tightly coupled to the resonator 64 (but preferably removable for maintenance or replacement).

The resonator preferably comprises a thin walled, durable material such as polypropylene, PET, PETE, vinyl, hard rubber, metal or other material. Ideally, the resonator is paper thin yet durable; a balance is struck between these generally conflicting criteria to provide an effective resonator, and the foregoing list of materials can all be effective resonator. The base 64b of the resonator engages the end 62b of the sound tube, directly or indirectly through the gasket 66. In a conventional manner, compressed sound waves press against the base 64b and generate amplified sound waves within the zone 24, preferably sound waves which emulate at least selected portions of a heartbeat. The sound waves exit annular side walls 64a of the resonator, which can have a generally frustoconical shape (as shown). The annular side walls 64a of the resonator also can be comprised of adjacent flat surfaces that can vibrate.

The resonator alters the frequency and distribution of the acoustic waves produced by the speaker 22. The resonating function of the resonator 64 results from the tight coupling with the sound tube 62. Consequently, the resonator can be positioned remote from the speaker itself Alternatively, the resonator 64 can be located adjacent the speaker 22 and end 62a of the sound tube, with the sound tube extending therefrom to convey the amplified acoustically attractive sound waves to one or more zones 24. If the resonator is not tightly coupled, it will not greatly modify the acoustic waves but will instead basically vibrate, which itself can be an assist in attracting certain insects. A thin walled inverted pot or cover can be loosely positioned above the sound tube 60, in lieu of the resonator 64, with the acoustic wave instead being imparted with a desired characteristic, by providing a suitable analog signal to the speaker 22.

Optionally, the exiting sound waves can co-act on a surface 68 which is opposite the base 64b or which is positioned to direct waves exiting from the resonator 64 in a desired direction, for example, within the zone 24. The sound distribution system 60 amplifies critical components of a heartbeat signal to better attract insects to the control station or to repel pests therefrom, while better differentiating critical components of the sound emitted by the speaker 22 from background noise.

Figure 3:
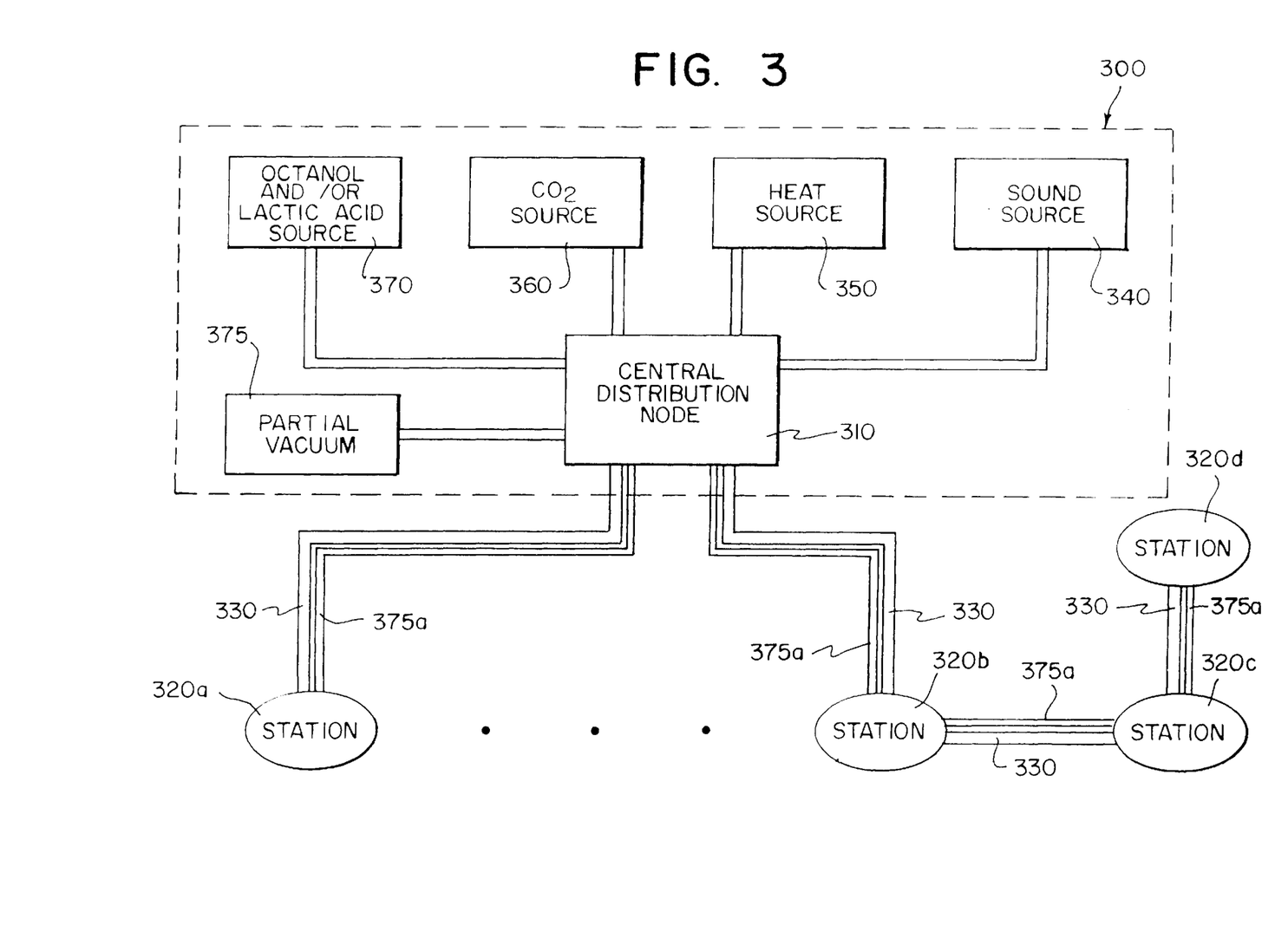
FIG. 3 illustrates a centralized system for either attracting insects to or repelling pests from plural control stations.

In accordance with a further aspect of the present invention and with reference now to FIG. 3, a centralized system 300 is described in which a plurality of control stations 320a–320d (only four shown; more generally, "control stations 320") are interconnected and driven from a central distribution node 310. The centralized system 300 has the central distribution node 310 configured to deliver various sources of attractants or repellants to remotely positioned control stations 320 through a suitable coupling 330. The coupling can consist of one or more parallel or coaxial tubes, for example, PVC tubing which carry the various sources to the remote control stations 320. The coupling is preferably positioned underground, but need not be, and may consist of 2.00" PVC electrical grade hollow tubing. The centralized arrangement permits relatively inexpensive control stations 320 to be positioned over a widely dispersed geographic area to control pests within that area.

One of the sources distributed by the central distribution node 310 is a sound source 340. The sound source provides sound waves through the coupling 330 to the plural control stations 320. The sound waves are generated by the speaker 22 in the manner described above in connection with FIGS. 1 and 2, and are propagated through the sound tube 60, which may be the same tubing as the coupling 330. The resonator 64 can be positioned at each control station, via a tight coupling of the resonator to the sound tube coupling 330, or can be positioned adjacent the speaker.

Another of the sources distributed by the central distribution node 310 is a heat source 350 which can be used to deliver a heated gas (e.g., air, or air containing the sound waves from the sound source 340) to the plural control stations 320 through the coupling 330. The presence of heat and its temperature at a given control station can be a critical factor for some pests, but not for others. Any heat to be delivered to the control stations 320 can be delivered together with the sound waves through the sound tube 60 or by way of a separate delivery tube.

FIG. 3 also shows gas sources 360 and 370 for delivering carbon dioxide gas and the vapors of octanol and/or lactic acid from the central distribution node, through the coupling 330 and to the remote control stations 320. Preferably, these substances are delivered at a controllable rate through dedicated tubing, which may be concentrically placed, separate from the tubing that delivers the sound waves and any heat, such as tube 382 (see FIG. 4). The controlled delivery of carbon dioxide gas remote from the device, for example, can excite certain blood-sucking insects free of any undesired anesthetization effect that might be associated with higher or uncontrolled levels of carbon dioxide gas released near the device. It is believed that a significant carbon dioxide pulse of about several cubic feet of gas or vapor at an interval of about every 4–5 minutes to about every 10 minutes fosters a feeding frenzy in the mosquitos that are attracted to the control stations.

In addition, a source of negative pressure 375 provided through dedicated tubing can establish a partial vacuum near the sound delivery tube 60 for drawing insects away from the sound delivery tube for collection at a remote collection device (e.g., net or bag) or control device (e.g., electrified grid). Because the source of negative pressure is not located proximate the control station, any noise that it might make will not undermine the attractive influence of the heartbeat sound being radiated from each control station. Optionally, baffles can be positioned relative to the source of negative pressure to isolate sound from that source and prevent it from propagating toward the control station together with the heartbeat sound.

Each of the control stations 320 includes control valves (e.g., ball valves) which permits the flow of gas, heat or sound waves and partial pressure to be regulated at each station. If the control stations are serially coupled to the central distribution node 310 (such as control stations 320b, 320c, and 320d), then the control valve is preferably positioned in a branch leading to one control station in the series so that it can decrease the flow to one station while only passively affecting the flow to other control stations in the series. A feedback arrangement can be used as known in the art of heating, ventilation and air conditioning, to better control the flow to other stations when the flow to one is adjusted.

Figure 3A:
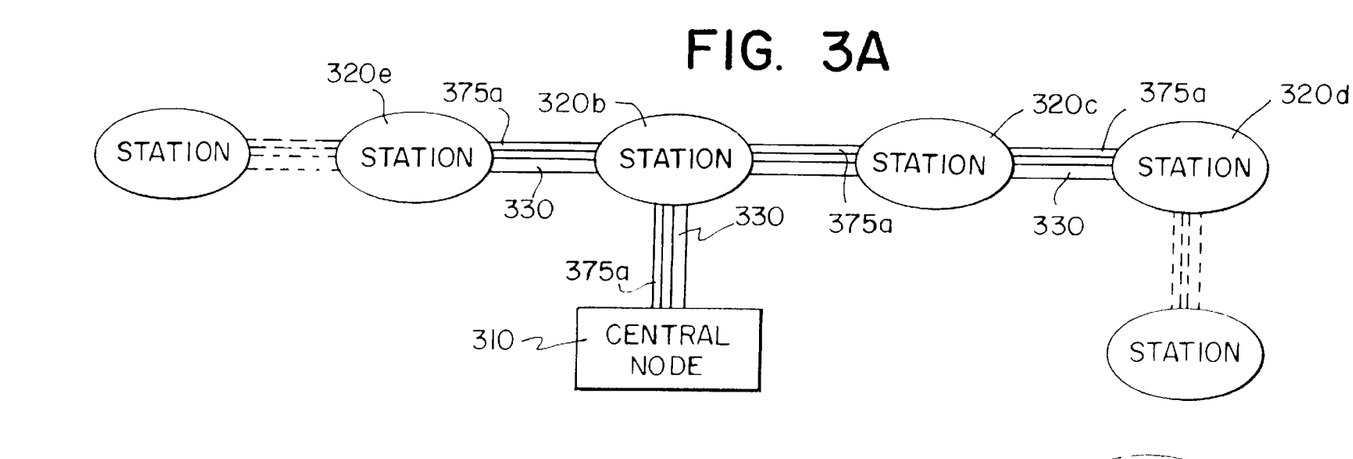
FIGS. 3A and 3B illustrate alternative arrangements of control stations in a centralized system as in FIG. 3.
Figure 3B:
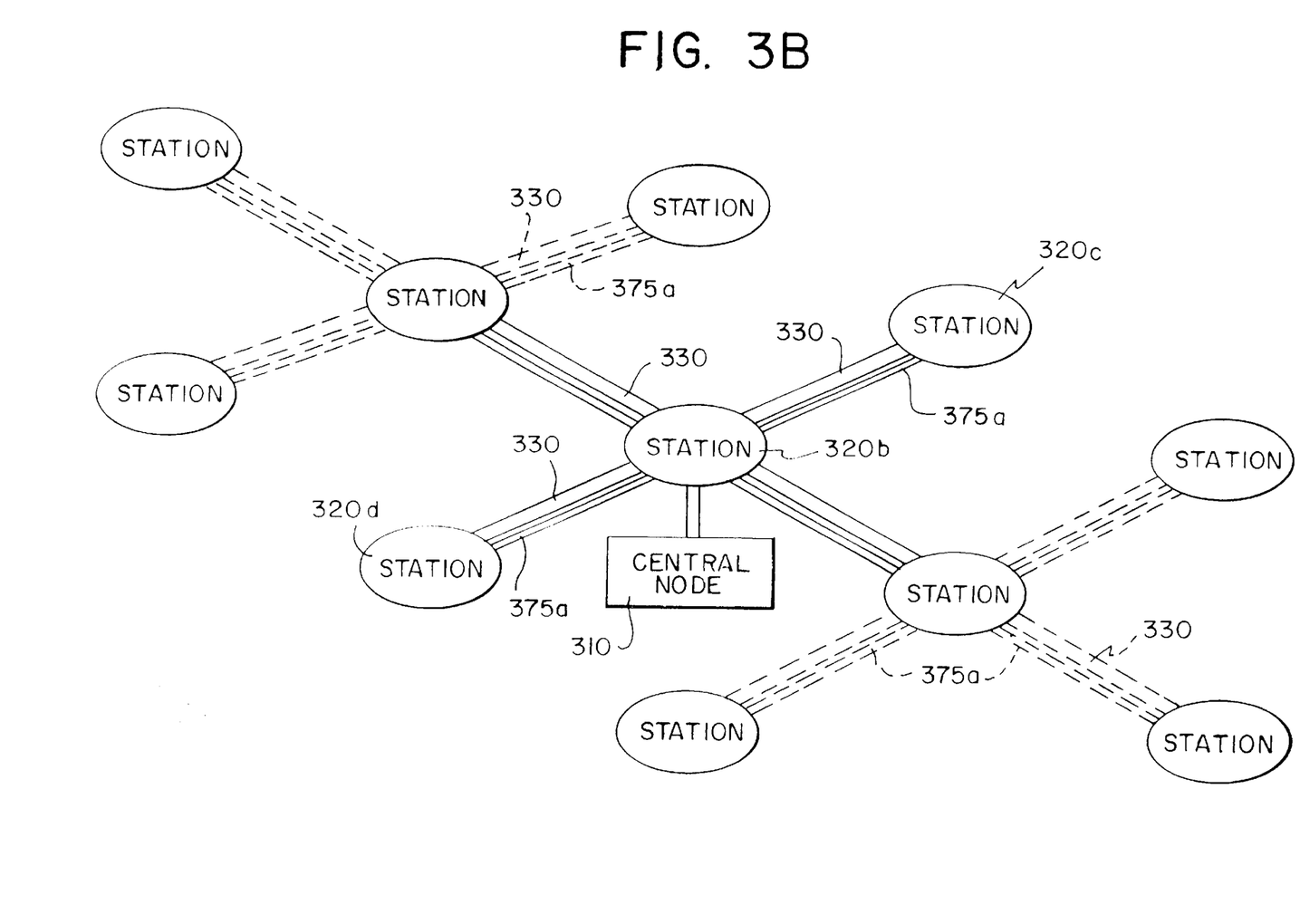

A variety of arrangements of couplings 330 and control stations 320 can be connected to a single central distribution node. FIGS. 3A and 3B illustrate, for example, two different arrangements in which the control stations 320 are positioned remote from the central distribution node in different patterns to more effectively control pests in a geographic region of interest. The dashed lines indicate the possibility of extensions of the pattern shown in solid lines. Of course, many other arrangements are possible, including combinations of the arrangements shown in the Figures, the arrangements of FIGS. 3, 3A and 3B being merely illustrative of three possible arrangements.

We have also determined that a single speaker 22 can be used to drive multiple control stations. Speaker 22 generates a positive longitudinal pressure wave or sound towards sound tube 60. However, a negative longitudinal pressure wave is also generated from the rear of speaker 22. Thus, a single speaker can be used to generate the desired sounds into both front and a rear sound tubes and a corresponding set of control stations (not shown). An alternative arrangement is to place a speaker 22 at each control station. All the speakers can be driven by a source at the central distribution node and can be connected by electrical wires provided in the tubing 320. In such an arrangement, tube 320 can also be used to distribute, if desired, carbon dioxide, heat, repellant, etc. to the control stations.

Figure 4:
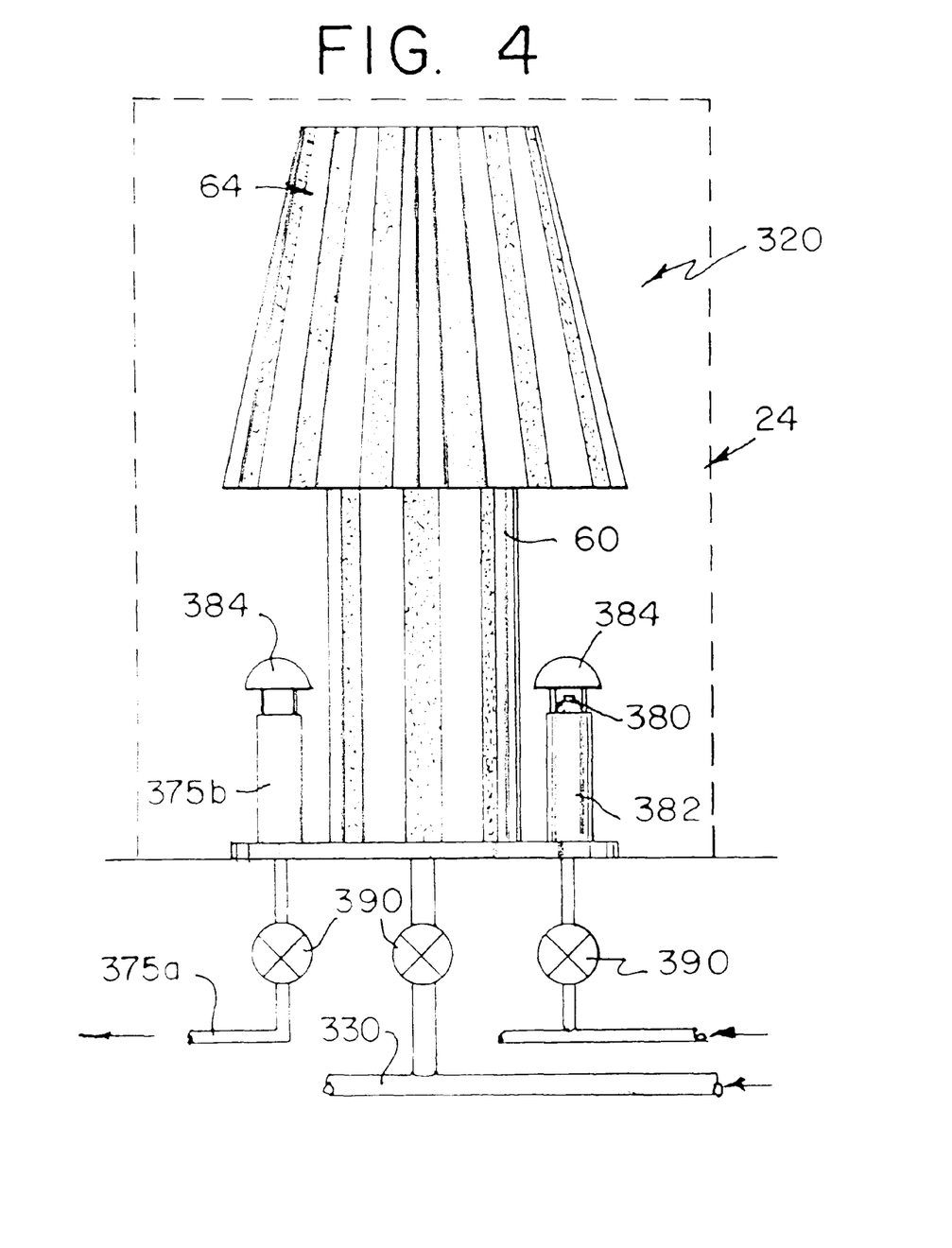
FIG. 4 illustrates one control station in detail.

Referring now to FIG. 4, a control station 320 is described in detail. Each control station includes a sound tube 60 which communicates with the coupling 330 to deliver heartbeat sound waves from the speaker 22 connected to the sound source 340 to the location of the control station. The sound tube 60 preferably projects approximately 1.5 feet above the ground, and more preferably includes the sound reflector 68. The sound tubes of different control stations can be positioned at different heights to ensure capture or control of both low-and high-flying insects. Optionally, the resonator 64 can be tightly seated upon the sound tube 60, as described above in connection with FIG. 1. Alternatively, the resonator can be included proximate the speaker 22, or not included at all, and the element 64 can instead be loosely seated over the sound tube 60 to keep the coupling 330 free of rain and debris, and also to vibrate and direct and radiate the heartbeat sound waves within the zone 24. A sound reflector 68 assists in filling the zone 24 with the acoustic energy delivered through the coupling 330 to the sound tube.

At a given distance from the control station, the intensity of the acoustic waves emanating therefrom can vary depending on the position of the sound pressure meter relative to the control station. Thus, the intensity can be higher directly above the control station due to the resonator, if any, and the sound reflector, depending on its orientation, relative to the intensity of the acoustic energy in other directions. Beyond a threshold intensity level, insects may not be attracted to a control station, at least in a given direction, and so the amplification of the heartbeat sound is preferably set to maximize the attraction of insects across as many directions as desired (e.g., to have the intensity within a prescribed range or below a threshold level alongside the control station). The control station can emit sound at a decibel level suitable for attracting mosquitos, for at least portions of a heartbeat sound, which is in the −40 dB to −10 dB range, as measured with a spectrum analyzer (1 cps increments), or 50 dB to 80 dB range, as measured with a digital sound level meter.

The control station further has a remote gas distribution port 380 positioned within the zone 24 to supply gas and/or vapor from the sources 360, 370, and other sources, if any gas delivery is desired. The gases are delivered through a supply tube 382 which is carried within or alongside the tube coupling 330. A rain shield 384 or the like keeps the tube 382 free of rain and debris. In addition, each control station has one or more ports 375b for insect collection, if desired, connected to the partial vacuum 375 via vacuum tubing 375a.

In addition, each control station has one or more valves 390 which control the relative amount of sound, heat, gas, and vacuum force that is delivered by each of the tubes 330 and the gas tube 382 and partial vacuum tube 375a. The port 375b, if desired, preferably has a rain cover and may or may not project above the sound reflector 68.

The portion of the sound tube that projects from the ground is preferably includes an attractive surface (such as a striped surface) and can be further covered with a pressure sensitive adhesive or an insecticide. The stripes can assist in attracting certain blood-sucking insects that have been drawn to the region of the control station by the sound waves. It is believed that certain insects are attracted to light surfaces while others are attracted to dark surfaces, and so the stripes provide a useful pattern to attract insects with either of these preferences. As can be appreciated, however, other patterns can be provided to tailor the surface to the preferences of various insects (e.g., camouflage, dots, zigzags, etc.).

In addition to or instead of an adhesive, the control station can source a pathogen such as a bacteria or fungus which an be conveyed with the insect back to its breeding grounds to kill eggs, larvae, and other adult insects.

Figure 5:
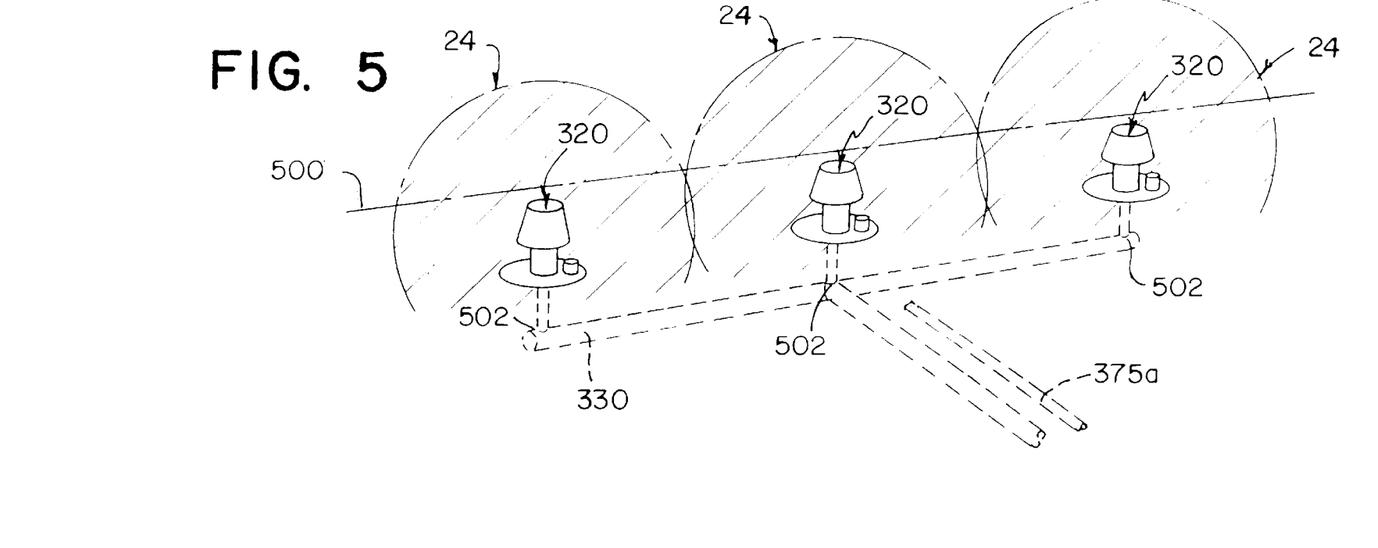
FIG. 5 illustrates a perspective view of several control stations interconnected in a centralized system.

In FIG. 5. several control stations are shown in a centralized system which provides a linear barnier which can be used to repel specific pests, or to attract insects such as mosquitos to one of the control stations 320. The details of each control station, including the valves 390 (not shown in this Figure), are described above in connection with FIG. 4. As can be appreciated from FIG. 5, a plurality of control stations 320 can be arranged in any desired manner to define a perimeter 500 of overlapping zones 24 (shown shaded) which serve as either a repellant or attractant of selected pests. The control stations 320 are spaced anywhere front about 50 feet to about 300 feet apart, but are spaced so as to generally ensure that the effectiveness of the control stations in defining the perimeter of overlapping zones 24 is not compromised. The control stations are connected to the central distribution node (not shown) through the hollow tube couplings 330 and tubes 375a (shown broken away at a location remote from the control stations). For ease of illustration, the coupling 330 includes several right angle bends 502; however, superior acoustic wave travel through the hollow tubing can be obtained through the use of more gradual bends, that is, bends that are less than 90°.

The sound emanating from spaced control stations establishes a virtual barrier for insects between the control stations, with the acoustic attractant emanating at a decibel level within a prescribed range, or the acoustic repellant emanating at a decibel level beyond the prescribed range or above a predetermined level. For animals, the acoustic repellant emanation need only to be at the decibel level audible to the pest that is to be repelled.

The particular insect to be attracted or repelled is targeted through the delivery from the central distribution node 310 to the control stations 320 of a predetermined combination of critical factors which include at least a heartbeat sound and possibly also heat, carbon dioxide, octanol, and/or lactic acid, each in a controlled amount. Carbon dioxide, for example, can be delivered to each of the control stations at a rate of about 50 to about 500 cc/min. The lower the rate, the better to minimize the gas requirements and cost.

Within the perimeter 500 (only one boundary shown), humans can recreate generally free of the targeted pest. Thus, a perimeter can be defined in a backyard, a hotel, a country club, a golf course, a public part, etc. to make outdoor space more enjoyable for humans.

Several observations are noteworthy to understand the effectiveness of the technique according to the present invention. Our studies suggest that heat, carbon dioxide and other byproducts of respiration are necessary to excite biting insects. Evidence has illustrated that, contrary to public impressions, mosquitos are not drawn to humans by heat of the human body, carbon dioxide output from humans, or their odor, but are strongly attracted to humans by their cardiac sounds. Mosquitos are, in fact, attracted to and obtain blood from reptiles, such as snakes, which are not hot-blooded and obviously have an odor quite dissimilar to humans. Mosquitos also are attracted to weak, sick, or aged people more than to healthy individuals. These people frequently have a heartbeat that generates a periodicity of signals at significantly higher rates than those of healthy individuals. Accordingly, it is believed that while mosquitos will be attracted to an acoustic signal indicative of a healthy individual in the periodicity (pulse rate) range of from 50 to 120 beats per minute, mosquitos will be strongly attracted to an acoustic signal in excess of 120 beats per minute, and preferably in the range of from about 150 cps to about 350 cps, which represents an unhealthy individual, and more preferably in the 150 cps to 250 cps range in which Applicants have determined that the heartbeat has a primary peak.

Thus, the recorded waveform in the player 20 or from the emulator can simulate a human heartbeat or particular components therein. For example, a waveform can be constructed to have a primary peak in the 150 cps to 250 cps range and a secondary peak in the 300 cps to 500 cps range. A suitable waveform can include frequency components in these ranges alone, or so that the frequency components in these two peaks dominate other frequencies in the waveform. The periodicity of the waveform, that is, the number of times that the signal appears, can be dynamically adjusted, for example, by a program running on a programmed machine such as the machine referred to above, or by circuitry comprising the emulator.

Various equipment can be used to generate acoustic signals representing the human heartbeat. See for example U.S. Pat. No. 3,317,092 and U.S. Pat. No. 3,994, 282. Alternatively, an actual human heartbeat can be recorded and rebroadcast to attract insects. Either signal can be electronically altered or fine-tuned to present a signal most suitable for attracting a preselected insect (e.g., mosquitos, ticks, blackflies, etc.) given the geographical area that the control station is positioned.

Any obstructions in the coupling can be removed using a high pressure blow-out which is selectively connected to the system for maintenance purposes (not shown).

The medical profession, and particularly cardiologists, have recognized that the acoustic signals from a heartbeat are not simply the "lub-dub" sounds familiar to lay individuals. More particularly, medical specialists have recognized the significance of the cadence, rhythm, and relationship between particular components of the heart sound, which are medically referred to as the S1, S2, S3, and S4 components of the heartbeat. While each of these component sounds in turn can have fluctuations functionally dependent upon the respiratory cycle of the individual, the characteristic frequency of these components is not significantly affected by this respiratory cycle. During both inspiration and expiration, the characteristic frequency of the S1 and S2 components for a healthy heart is normally in the range of from 110 cps to 120 cps, while the characteristic frequency of the S3 component is in the range of from 70 cps to 90 cps. The S4 component can be inaudible to humans using a normal stethoscope for a patient less than 50 years old, although there is no reason to believe that the S4 component, which is generally in the range of 50 cps to 70 cps, is not detected by mosquitos. As indicated above, evidence has shown that mosquitos are strongly attracted to individuals with a damaged heartbeat, and the medical profession has studied in depth the timing, configuration, and duration of heart murmurs. While certain murmurs have a relatively low frequency in the range of from 60 cps to 100 cps, heart murmurs more often are in the medium-frequency range of from 100 cps to 250 cps, or are in the higher frequency range of more than 300 cps associated with "blowing."

The above evidence suggests that mosquitos will be attracted to acoustic signals in the range of from 50 cps to 120 cps, and will be strongly attracted to its acoustic signals in the range of from about 150 cps to about 350 cps. Applicants presently believe that one or more frequencies in the range of 150 cps to 250 cps together with one or more frequencies in the range of peak in the 300 cps to 500 cps range comprise the best signal for attracting mosquitos.

Discrete "ejection sounds" or clicks associated with a damaged heart have a frequency in the 160 to 180 cps range, and these clicks also can be a reason that mosquito are particularly attracted individuals with damaged hearts. We determined that mosquitos are attracted to sound waves from an acoustic speaker that replicates the sounds of a heartbeat, and thus signals within the frequency range described above would preferably be output from a speaker in accordance with the "lub-dub" rhythm and cadence associated with a heartbeat.

The method of the present invention is suggested by the apparatus disclosure above. The method for attracting bloodsucking insects, such as mosquitos, to an attractant zone comprises generating a source of electrical energy, generating control signals powered by the source of electrical energy, and generating acoustic waves simulating a human heartbeat in response to the control signals for attracting insects to an attractant zone. If desired, the insects can be eradicated once attracted to the zone utilizing the techniques described above. The device of this invention requires little if any maintenance, and can be reliably installed and utilized by relatively inexperienced personnel.

It should be noted that no one set of critical or design factors will work well for all blood-sucking insects. The parameters for attracting insects can change from location to location and with the seasons and time of day. The present invention, however, allows for ready modification of the control station placement and operational parameters in a quick and inexpensive way. For example, all control stations can be adjusted from the central location, and the performance of one relative to others can be adjusted by way of the valves 390.

By setting the signature of the heartbeat sound to mimic the heartbeat of a natural predator, birds and other nuisance animals an be repelled. A sound-scarecrow can be established to repel, for example, birds, rats, rabbits, deer and racoons from a garden or farm to protect crops and grain/food intended for consumption by farm animals. The heartbeat sound of dogs, foxes, cats and bobcats, for example, can be used to repel a variety of nuisance animals. The repelling heartbeat sound should cycle so that it becomes louder and more rapid in such a manner as to prevent pests from becoming adapted to the heartbeat sound. Such a control station can be mounted on a vehicle to repel animals (e.g., deer from a road as a vehicle approaches the animals.

A tubing that contains air or gas is still hollow. A tubing is hollow even if it has caps or stops at one or both ends.

Various changes and modifications will become apparent from the foregoing discussion, and are considered within the scope of the invention. Such changes and modifications should be understood as being within the scope of this invention, which is limited only by the claims attached hereto.

The low frequency sound emitted by the device can be generated via a speaker or created by a mechanical device such as a clicker, fan, lifter cam or solenoid with an electrical drive mechanism, etc.

The low frequency sounds that attracts bloodsucking insects to their host can be varied in pitch, frequency, periodicity, and loudness to best simulate the sounds of the slow heartbeat of large mammals to faster heartbeat of smaller mammals to the much faster heartbeat of a bird in order to attract respectively different mammal and avian feeders.

We claim:

1. In a system having a central node and a plurality of control stations remotely positioned with respect to the central node and connected thereto by hollow tubing, a method for attracting insects to at least one of the control stations, comprising the steps of:
    a) generating at the central node an acoustic wave, the acoustic wave having a frequency that is simulative of at least a portion of a human heartbeat;
    b) propagating the acoustic wave through the hollow tubing;
    c) emitting the acoustic wave at said at least one of the control stations to attract insects into an attractant zone proximate to the control station; and
    d) controlling a population of insects that have been attracted into the attractant zone by an act selected from the group of: killing at least a portion of the population of insects, immobilizing at least a portion of the population of insects, and trapping at least a portion of the population of insects.

2. The method as in claim 1, wherein the hollow tubing is connected to a source of negative pressure, wherein the step of controlling includes the step of drawing insects into the hollow tubing once attracted into the attractant zone.

3. The method as in claim 2, comprising the additional step of isolating the sound generated by the source of negative pressure to prevent it from propagating through the hollow tubing toward the control station.

4. The method as in claim 1, wherein the step of controlling includes the steps of detecting insects with the attractant zone, generating a signal in response to the detecting step, and activating an eradication mechanism in response to the signal.

5. The method as in claim 1, wherein the step of controlling includes the step of eradicating insects within the attractant zone with a pesticide.

6. The method as in claim 5, wherein the pesticide is affixed to the control station.

7. The method as in claim 1, wherein the step of controlling includes the steps of providing a gluey surface on the control station and trapping the insects at the control station using the gluey surface.

8. The method as in claim 1, wherein the step of generating an acoustic wave comprises generating acoustic waves in the range of from 50 cps to 350 cps.

9. The method as in claim 8, including the additional step of selectively adjusting the frequency range of the generated acoustic waves.

10. The method as in claim 1, wherein one or more of the byproducts of respiration or an insect repellant are released proximate the control station.

11. The method according to claim 1, wherein acoustic waves are emitted at the control stations by a speaker having a resonator coupled thereto.

12. The method as in claim 1, wherein a resonator is placed in each of the control stations to enhance or modify acoustic waves emitted at each control station.

13. The method as in claim 1, wherein at least a portion of the control stations includes a pathogen to biting arthropods.

14. The method as in claim 13, wherein the pathogen is either bacterial or fungal.

15. The method as in claim 13, wherein the pathogen is selected so that it acts upon the arthropod after a period of time sufficient to permit the arthropod to carry the pathogen to another location where insects breed.

16. The method as in claim 1, including the additional step of releasing carbon dioxide near the control station at prescribed intervals.

17. The method as in claim 1, wherein the step of controlling the population of insects includes a step selected from the group of: eradicating the insects within the attractant zone, providing a source of negative pressure within the attractant zone, providing a gluey surface within the attractant zone, providing a pathogen to biting arthropods within the attractant zone and a one way trap within the attractant zone.

18. A method for establishing a barrier to animal pests comprising the steps of;
   a) providing at a central distribution point a sound source which generates a sound wave which attracts the animal pests;
   b) establishing a branching network of hollow tubing, the network of hollow tubing being communicatively connected to the central distribution point for receiving the generated sound wave;
   c) connecting a first control station to the branching network of hollow tubing;
   d) connecting a second control station to the branching network of hollow tubing, there being no more than a prescribed spacing between the first and second control stations;
   e) conveying at least the sound wave from the central distribution point to the plural control stations for emanation thereat to attract animal pests into an attractant zone proximate each control station; and
   f) controlling a population of animal pests that have been attracted into the attractant zone by an act selected from the group of: killing at least a portion of the population of animal pests immobilizing at least a portion of the population of animal pests, and trapping at least a portion of the population of animal pests,
   whereby the barrier is defined by the plural control stations.

19. A method for establishing a barrier to bloodsucking insects comprising the steps of:
   a) providing at a central distribution point a sound source which generates a sound wave which attracts the bloodsucking insects;
   b) establishing a branching network of hollow tubing, the network of hollow tubing being communicatively connected to the central distribution point for receiving the generated sound wave;
   c) connecting a first control station to the branching network of hollow tubing;
   d) connecting a second control station to the branching network of hollow tubing, there being no more than a prescribed spacing between the first and second control stations;
   e) conveying at least the sound wave from the central distribution point to the plural control stations for emanation thereat to attract insects into an attractant zone proximate each control station; and
   f) controlling a population of insects that have been attracted into the attractant zone by an act selected from the group of: killing at least a portion of the population of insects, immobilizing at least a portion of the population of insects, and trapping at least a portion of the population of insects,
   whereby the barrier is defined by the plural control stations.

* * * * *